No. 672,906. Patented Apr. 30, 1901.
C. M. KIMPLEN & J. G. CAMPBELL.
MOTOR.
(Application filed Sept. 24, 1900.)
(No Model.) 2 Sheets—Sheet 1.
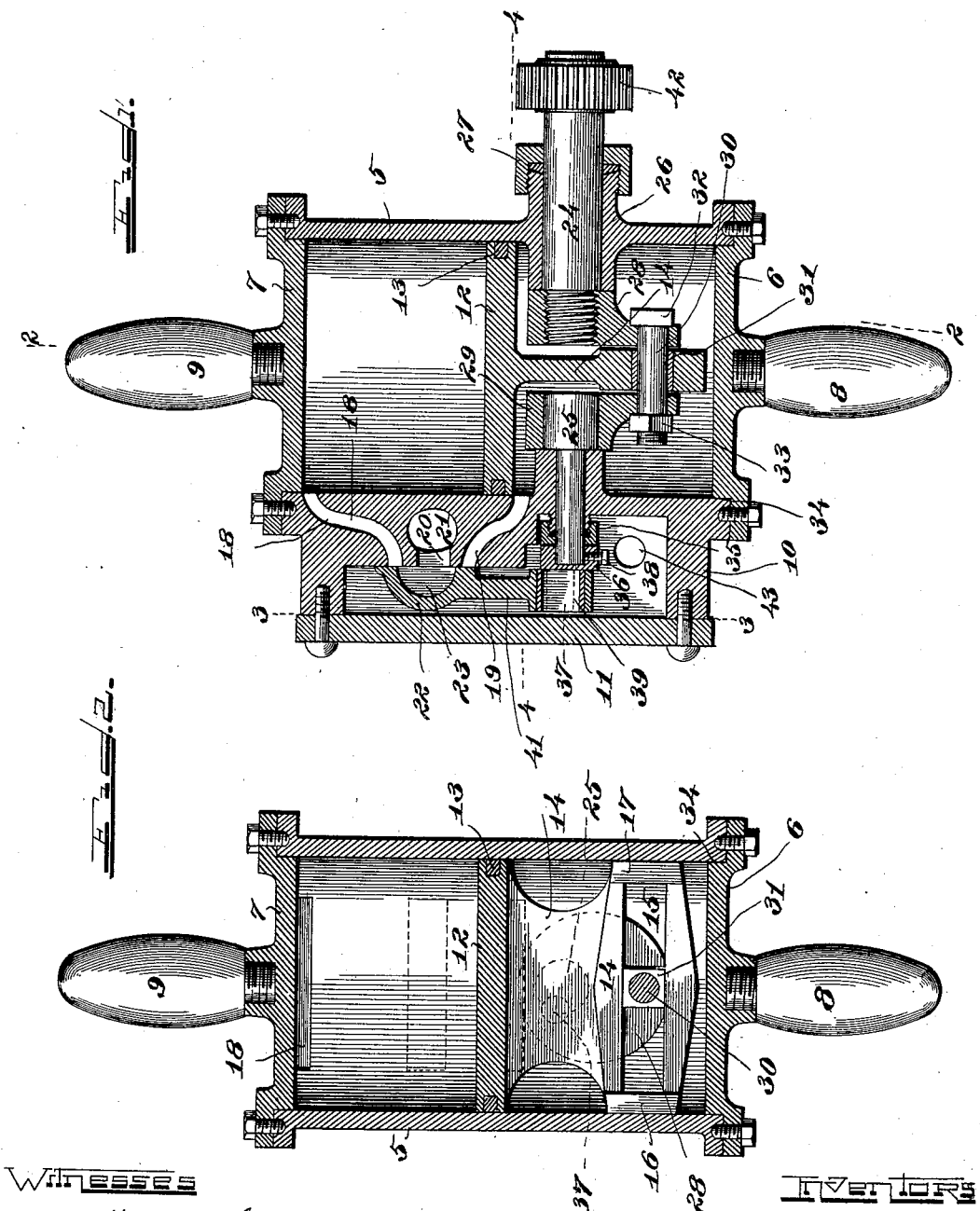

No. 672,906. Patented Apr. 30, 1901.
C. M. KIMPLEN & J. G. CAMPBELL.
MOTOR.
(Application filed Sept. 24, 1900.)
(No Model.) 2 Sheets—Sheet 2.
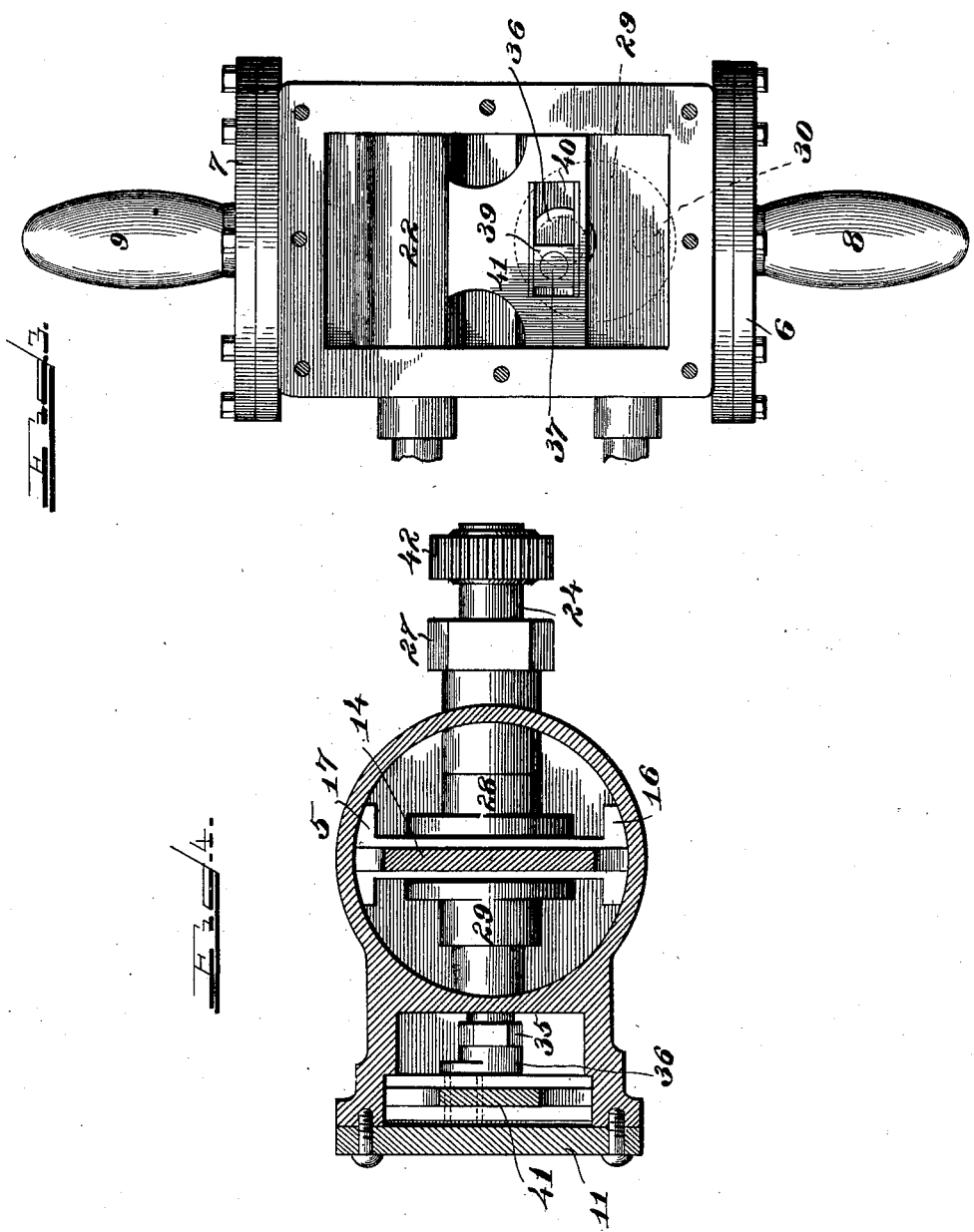

UNITED STATES PATENT OFFICE.

CASSIUS M. KIMPLEN AND JESSE G. CAMPBELL, OF TOPEKA, KANSAS.

MOTOR.

SPECIFICATION forming part of Letters Patent No. 672,906, dated April 30, 1901.

Application filed September 24, 1900. Serial No. 30,911. (No model.)

*To all whom it may concern:*

Be it known that we, CASSIUS M. KIMPLEN and JESSE G. CAMPBELL, citizens of the United States, residing at Topeka, in the county of Shawnee and State of Kansas, have invented certain new and useful Improvements in Motors, of which the following is a specification, reference being had to the accompanying drawings.

Our invention relates to motors operated by air, steam, or other suitable gas, and has for one object to provide an improved motor which will be compact and economical in operation, effecting a saving of air or steam without the loss of power.

Another object is to provide a motor in which the operating parts will be so arranged as to avoid excessive friction by securing effectual lubrication of the bearings, thereby prolonging the life of the motor.

We accomplish these objects by extending the main shaft of the motor into the cylinder and connecting it there by suitable means with the piston-head, so that the connections are in the cylinder and are exposed to the action of the steam introduced thereinto to drive the piston-head, which steam carries a greater or less proportion of lubricant, and consequently effectually lubricates all bearings exposed to it.

More specifically, our invention consists in providing the piston-head with a slotted yoke and extending the main shaft into the cylinder and connecting it by sliding connections to said yoke, said connections being exposed to the live steam in the cylinder and so arranged that as the piston-head reciprocates the shaft is rotated.

Our invention further consists in operating the valve mechanism by direct connection with the main shaft, thus avoiding a multiplicity of parts, and also in arranging said connections in the steam-chest to provide for their constant lubrication.

Our invention further consists in certain details, which will be hereinafter pointed out.

That which we regard as new will be set forth in the claims.

In the accompanying drawings, Figure 1 is a longitudinal section through the steam chest and cylinder, with the piston and valve mechanism. Fig. 2 is a vertical section taken on line 2 2 of Fig. 1. Fig. 3 is a view showing the steam chest and valve, with the operating mechanism therefor, taken on line 3 3 of Fig. 1; and Fig. 4 is a cross-section on line 4 4 of Fig. 1.

Referring to the drawings, 5 indicates the cylinder, of which 6 7 are the heads. The said heads carry handles 8 9 for holding the motor in operative position. It will be understood that the machine illustrated is a hand-motor, and the handles 8 9 are provided on that account; but if the machine were made on too large a scale to be operated by hand the handles would not be necessary.

10 indicates the steam-chest, of which 11 is the cover, secured thereto by bolts or screws in the usual way.

12 indicates a piston-head which is fitted in the cylinder 5 and is adapted to reciprocate therein. It is provided with suitable packing 13 on its periphery, as shown in Fig. 1. The piston-head 12 is also provided at one side with a yoke 14, which projects from the center thereof and is provided with a transverse slot 15, the length of which is almost equal to the diameter of the cylinder. The length of the yoke 14 is equal to the internal diameter of the cylinder, and at its ends it is provided with bearing-plates 16 17, which bear against the interior surface of the cylinder, forming guides to prevent vibration of the piston-head. The intermediate portion of the yoke 14 is preferably cut away to make it lighter, as shown in Fig. 2.

18 19 indicate ducts which extend from the steam-chest 10 to the cylinder 5, said duct 18 opening into the cylinder near the head 7 thereof, and the duct 19 opening into the cylinder at about the center thereof or slightly below the lowermost position of the piston-head 12, as shown in Fig. 1. The ducts 18 19 open into the steam-chest at points much closer together, and between them is an exhaust-port 20, which communicates with an exhaust-passage 21, as shown in Fig. 1.

22 indicates a slide-valve having a recess 23, said slide-valve being arranged to move over the ports which open into the ducts 18 19 and the exhaust-port 20, to connect either of the ducts 18 or 19 with the exhaust-port and to admit steam to the other duct in the manner common to slide-valves.

24 25 indicate the parts of a two-part drive-shaft, one of the parts of said shaft being utilized to communicate power to the machine to be driven, and the other being used to operate the slide-valve. The member 24 of the shaft is journaled in a suitable bearing 26, arranged in the cylinder 5 and projecting thereinto, said bearing being provided with a stuffing-box 27, as shown in Fig. 1. The inner end of the member 24 of the shaft is screw-threaded and carries a crank-disk 28, arranged parallel with the yoke 14, as shown in Fig. 1. The inner end of the member 25 of the shaft carries a similar crank-disk 29 at the opposite side of the yoke 14.

30 indicates a pin which extends through the ends of the disks 28 29 and also passes through a sliding box 31, fitted to slide in the slot 15 of the yoke 14. The pin 30 is preferably in the form of a bolt, having a head 32 and a nut 33, so that it may readily be removed and replaced. By this construction when the piston 12 is reciprocated the block 31 is also reciprocated longitudinally of the cylinder, and by reason of its connection with the disks 28 29 is also reciprocated transversely of the cylinder in the slot 15, the result being that the shaft members 24 25 are continuously rotated. Instead of using disks 28 29 crank-arms may be employed, as they would operate in the same way.

The yoke 14 and the connections between it and the shaft members 24 25 are all arranged in the lower part of the cylinder 5 and are enveloped in the steam or gas admitted thereto, so that they are constantly subjected to the action of the steam and the lubricant carried by it and friction between the working parts is practically overcome.

The shaft member 25 operates the sliding valve, and to this end it is journaled in a suitable bearing 34, which is arranged between the cylinder and steam-chest and projects into the steam-chest. A suitable stuffing-box 35 is provided to prevent steam from passing directly from the steam-chest into the cylinder. At the end of the shaft member 25 is provided a disk 36, from which projects a crank-pin 37, as shown by dotted lines in the drawings. The disk 36 is secured to the shaft by a set-screw 38, so that it may be removed or adjusted, as may be necessary. The pin 37 fits into a suitable bearing-box 39, carried in a transverse slot 40 in a yoke 41, connected to the slide-valve 22, as shown in Figs. 1 and 3. The pin 37 is set eccentrically with reference to the shaft member 25, as shown in the drawings, so that as said shaft member rotates the block 39 reciprocates the slide-valve 22, at the same time moving transversely in the slot 40. The crank-pin 37 is so adjusted that it operates the slide-valve 22 to admit steam to the duct 19, and connects the duct 18 with the exhaust-port 20 just as the piston-head 12 leaves its lowermost position, and similarly admits steam to the duct 18 and exhausts it through the duct 18 just after the piston-head leaves its uppermost position. The steam is therefore admitted alternately at either side of the piston-head, causing its reciprocation and rotating the shaft members 24 25.

The shaft member 24 is preferably provided with a pinion 42 for connecting it with the machine to be driven; but it may carry a pulley instead or may have a tool-socket fitted to receive a tool and be so used without the intervention of intermediate mechanism.

43 indicates the steam-inlet, through which steam is admitted to the steam-chest.

That which we claim as our invention, and desire to secure by Letters Patent, is—

1. In a motor, the combination of a cylinder, a single reciprocating piston-head therein, a shaft, connections in said cylinder between said shaft and piston-head for rotating said shaft by reciprocation of the piston-head, and means for admitting a fluid to said cylinder alternately at opposite sides of the piston-head for reciprocating the same, substantially as described.

2. In a motor, the combination of a cylinder, a single reciprocating piston-head therein, a shaft projecting into said cylinder, connections in said cylinder between said shaft and the piston-head for rotating said shaft by the reciprocation of the piston-head, and means for admitting a fluid to said cylinder alternately at opposite sides of the piston-head for reciprocating the same, substantially as described.

3. In a motor, the combination of a cylinder, a single reciprocating piston-head therein, a shaft, crank mechanism in said cylinder connecting said shaft and said piston-head for rotating said shaft by the reciprocation of the piston-head, and means for admitting a fluid to said cylinder alternately at opposite sides of the piston-head for reciprocating the same, substantially as described.

4. In a motor, the combination of a cylinder, a single reciprocating piston-head therein, a two-part shaft, the members of said shaft extending into said cylinder from opposite sides, crank mechanism connecting said shaft members with said piston-head for rotating said shaft members by the reciprocation of the piston-head, and means for admitting a fluid to said cylinder alternately at opposite sides of the piston-head for reciprocating the same, substantially as described.

5. In a motor, the combination of a cylinder, a single reciprocating piston-head therein, a two-part shaft, the members of said shaft extending into said cylinder from opposite sides, crank mechanism connecting said shaft members with said piston-head for rotating said shaft members, inlets for admitting a fluid to said cylinder at opposite sides of the piston-head, valve mechanism for controlling the admission of the fluid to said cylinder, and means connected with one of said shaft members for operating said valve mechaninsm to admit the fluid alternately at opposite sides of the piston-head, substantially as described.

6. In a motor, the combination of a cylinder, a single reciprocating piston-head therein, a two-part shaft, the members of said shaft extending into said cylinder from opposite sides, crank mechanism connecting said shaft members with said piston-head for rotating said shaft members, inlets for admitting a fluid to said cylinder at opposite sides of the piston-head, a slide-valve for controlling the admission of the fluid to said cylinder, and means connected with one of said shaft members for controlling said slide-valve to admit the fluid alternately at opposite sides of the piston-head, substantially as described.

7. In a motor, the combination of a cylinder, a single reciprocating piston-head therein, a two-part shaft, the members of said shaft extending into said cylinder from opposite sides, crank mechanism connecting said shaft members with said piston-head for rotating said shaft members, inlets for admitting a fluid to said cylinder at opposite sides of the piston-head, a slide-valve for controlling the admission of the fluid to said cylinder, and crank mechanism connected with one of said shaft members for controlling said slide-valve to admit the fluid alternately at opposite sides of the piston-head, substantially as described.

8. In a motor, the combination of a cylinder, a single reciprocating piston-head therein, a yoke connected to said piston-head and having a transverse slot, a shaft, a crank connected to said shaft and extending into the slot in said yoke, and means for admitting a fluid to said cylinder alternately at opposite sides of the piston-head for reciprocating the same, substantially as described.

9. In a motor, the combination of a cylinder, a single reciprocating piston-head therein, a yoke in said cylinder connected to said piston-head, said yoke having a transverse slot, a sliding block arranged in said slot, a shaft, a crank carried by said shaft and connected to said sliding block, and means for admitting steam to said cylinder alternately at opposite sides of said piston-head, substantially as described.

10. In a motor, the combination of a cylinder, a single reciprocating piston-head therein, a yoke in said cylinder connected to said piston-head, said yoke having a transverse slot, a sliding block in said slot, a two-part shaft extending into said cylinder, cranks carried by the members of said shaft and connected to said sliding block, a valve for controlling the admission of a fluid to said cylinder alternately at opposite sides of the piston-head, and means carried by one of the said shaft members for operating said valve, substantially as described.

11. In a motor, the combination of a cylinder, a single reciprocating piston-head therein, a yoke connected to said piston-head and having a transverse slot, the ends of said yoke forming guides which engage the interior surface of the cylinder, a shaft, a crank connected to said shaft and extending into the slot in said yoke, and means for admitting a fluid to said cylinder alternately at opposite sides of the piston-head for reciprocating the same, substantially as described.

12. In a motor, the combination of a cylinder, a single reciprocating head therein, a shaft, connections in said cylinder between said shaft and the piston-head for rotating said shaft by the reciprocation of the piston-head, a steam-chest, a valve in the steam-chest for admitting steam to said cylinder alternately at opposite sides of the piston-head, and means in the steam-chest connected with said shaft for operating said valve, substantially as described.

CASSIUS M. KIMPLEN.
JESSE G. CAMPBELL.

Witnesses:
  F. E. WILCOX,
  J. H. COE.